United States Patent [19]

Perine

[11] Patent Number: 5,200,825
[45] Date of Patent: * Apr. 6, 1993

[54] COMMERCIAL INSERTION SYSTEM REMOTELY CONTROLLING MULTIPLE VIDEO SWITCHES

[75] Inventor: Michael C. Perine, Key Biscayne, Fla.

[73] Assignee: Beam Laser Systems, Inc., Miami, Fla.

[*] Notice: The portion of the term of this patent subsequent to Mar. 21, 2006 has been disclaimed.

[21] Appl. No.: 907,175

[22] Filed: Jul. 1, 1992

[51] Int. Cl.$^5$ .................. H04N 5/268; H04N 7/10; H04N 7/08
[52] U.S. Cl. ........................ 358/181; 358/86; 358/84; 358/142
[58] Field of Search .............. 358/86, 84, 181, 142

[56] References Cited

U.S. PATENT DOCUMENTS

| | | | |
|---|---|---|---|
| 4,404,589 | 9/1983 | Wright, Jr. | 358/86 |
| 4,625,235 | 11/1986 | Watson | 358/86 |
| 4,638,181 | 1/1987 | Deiss | 358/181 |
| 4,638,359 | 1/1987 | Watson | 358/147 |
| 4,656,629 | 4/1987 | Kondoh et al. | 358/86 |
| 4,733,301 | 3/1988 | Wright, Jr. | 358/181 |
| 4,814,883 | 3/1989 | Perine | 358/181 |
| 4,975,771 | 12/1990 | Kasstly | 358/146 |
| 5,099,319 | 3/1992 | Esch et al. | 358/86 |
| 5,109,414 | 4/1992 | Harvey | 380/9 |

OTHER PUBLICATIONS

Don Rice–"Implementing A Commercial Insertion Systems" Mar. 1989.
Action Media 750 Delivery Board Product Brochure (intel 1990).

*Primary Examiner*—John K. Peng
*Attorney, Agent, or Firm*—Robert C. Kain, Jr.

[57] ABSTRACT

The video switch system remotely controls on a per switch, and hence a per channel, basis the insertion of a programmed channel video signal sent over one telecommunications network, a commercial video signal sent with the switch commands over another network or a locally generated video signal compiled from digitally stored video signals located on a digital storage device by insert locator data sent with the switch commands and the commercial insert video. The video switch system, in preferred embodiments, can generate a plurality of third video signals based upon a plurality of insert location information that is part of the insert locator data and apply respective third video signals to one or more of the video switches dependent upon switch commands and insert locator data generated remotely and received at the cable head end. The digitally formatted video signals can be sent to the video switch system via the second telecommunications network or via phone lines or be hand delivered on compact disc-read only memory (CD ROMs), magnetic tape, or other transportable media capable of storage of digital data.

11 Claims, 3 Drawing Sheets

FIG. 3

| TIME | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | |
|---|---|---|---|---|---|---|---|---|---|---|---|---|---|
| COMM | CH1 DEF-$t_1$ | CH2 ACI-$t_2$ | CH1 ACI-$t_3$ | CH3 ACI-$t_4$ | CH1 DCI$_{1a}$ | CH2 DCI$_{2b}$ | CH2 DEF | CH1 DCI$_{1c}$ | CH3 DCI$_{1a}$ | CH1 DCI$_{1b}$ | CH1 DEF | CH3 DCI$_{3b}$ | CH3 DEF · · |
| VS$_1$ | X DEF | DEF | X ACI | ACI | X DCI LOC. 1a | DCI LOC. 1a | X DCI LOC. 1c | DCI LOC. 1c | DCI LOC. 1a | X DCI LOC. 1b | X DEF | DEF | · · |
| VS$_2$ | DEF | X ACI | ACI | ACI | X DCI LOC. 2b | · | DEF | · | · | · | · | · | · · |
| VS$_3$ | DEF | DEF | DEF | X ACI | · | · | · | X DCI LOC. 1a | X DCI LOC. 1a | · | X DCI LOC. 3b | X DEF | · · |
| ACI | 10 | 1 2 3 4 | | 5 | 6 | 7 | 8 | 9 | 10 | 1 2 3 4 | | 5 | 6 |
| LOC. 1a | | | | | D1 | D2 | D3 D4 D5 | | | | | | |
| LOC. 1b | | | | | | | | | | D1 D2 D3 D4 D5 | | | |
| LOC. 2b | | | | | | S.FR. | | | | | | | |
| LOC. 3b | | | | | | | | | | | | S.FR. | |
| LOC. 1c | | | | | | | | D12 D13 D14 | | | | | |

DCI { LOC. 1a, LOC. 1b, LOC. 2b, LOC. 3b, LOC. 1c }

COMMERCIAL INSERTION SYSTEM REMOTELY CONTROLLING MULTIPLE VIDEO SWITCHES

TECHNICAL FIELD

The present invention relates to a commercial insertion system remotely controlling multiple video switches.

Cable television systems deliver a plurality of programmed television channels to subscribers. Cable system operators receive the programmed channel video signals from high speed telecommunications networks (satellites or fiber optic cable), condition those channel signals, mix the signals and place them at a cable head end onto the cable system wire leading to the cable subscribers. The companies producing and distributing the programmed channels sometimes enter into contractual relationships with the cable system operators which permit the cable system operators to insert local TV commercials into the broadcast channel video signal at prescribed times during each hour of broadcast time. Accordingly, the cable system operator can insert commercials into these local available (local avails) time slots and generate additional income from broadcasting the inserted commercials rather than broadcasting via the cable system the commercials supplied with the programmed channel video signal broadcast.

BACKGROUND ART

U.S. Pat. No. 4,814,883 to Perine et al. discloses a multiple input/output video switch for commercial insertion. FIG. 1 enclosed herewith illustrates a portion of the commercial insertion system described in the Perine patent. Video switches $VS_1$, $VS_2$ and $VS_n$ are respectively associated with channels 1 (CH1), channel 2 (CH2) and channel n (CHn). The video switches are located at the cable head end. At the head end, the cable system operator receives a plurality of programmed channel video signals, some of which are identified in FIG. 1 as CH1-DEF, CH2-DEF and CHn-DEF, via a first telecommunications network (a high speed television broadcast network customarily using satellite or fiber optic cable). The input CH1-DEF to video switch $VS_1$ identifies that the programmed channel video signal CH1 is the default (DEF) signal for that video switch. A stream of commercial inserts (CI) is also applied to each video switch, as well as a third, locally generated video signal which is a single frame (S.Fr.) video signal. The commercial insert video signal is received by the cable system operator via a second high speed telecommunications network along with a series of video switch commands (Sw.Comm.). Accordingly, each video switch in the Perine receives a respective programmed channel video composite signal, a commercial insert video composite signal and a local generated, single frame (S.Fr.) signal.

Each respective video switch is controlled by first, second and third switch commands respectively corresponding to a programmed channel switch command, a commercial insert switch command and a local video switch command. These commands are applied to each switch on a per switch basis (Sw.Comm.1; Sw.Comm.2; Sw.Comm.n) in accordance with the stream of commands coming from a remote location and via the second telecommunications network. As described in greater detail in the Perine patent, at the remote location, each programmed channel is monitored and certain audio indicators are sensed to determine when a local avail is approaching. A computer at the remote location notes the beginning and the end of each commercial segment in the generally continuous sequential stream of commercial inserts (CI) broadcast to the cable system operator over the second telecommunications network. If a local avail for a particular programmed channel coincides with the beginning of a local avail, the computer at the remote location generates a switch command for a particular video switch thereby commanding the switch to change its state and switch from the default (CH1-DEF) to the commercial insert (CI) at a particular time t. If the local avail begins at an intermediate time during a commercial insert (CI) segment of the CI stream, the computer at the remote location generates a switch command changing the state of the switch ($VS_1$) to apply the single frame (S.Fr.) video signal to its output (V.OUT) until the beginning of the next CI segment at which time the remote computer generates the appropriate switch command thereby changing switch $VS_1$ to insert the stream of commercial inserts at that switch over time t. Each video switch in the Perine patent includes a frame blanking (F.BLK.) circuit device which blanks the output of the switch for a certain period of time such that the inserted video signal (either the default, the CI, or the single frame insert) can be synchronized or timed with the programmed channel video signal. As an additional feature, the video switch includes character generators (CH.GEN.) with which the cable system operator can overlay characters onto the composite video signal. Node A in FIG. 1 simply shows that the video switch handles three video inputs and selects one of those video inputs as an output based upon the remotely generated switch commands.

DISCLOSURE OF INVENTION

It is an object of the present invention to provide a commercial insertion system which inserts, by remote control, either a sequential stream of commercial inserts or a locally generated video signal that corresponds to one of a plurality of digitally formatted video signals stored locally at or near the switch.

It is another object of the present invention to provide a commercial insertion system wherein the switch commands are generated remotely and sent over a telecommunications network along with a commercial insert video signal and insert locator data that enables the video switch system at the cable head end to locate where in the digital storage a particular digitally formatted video signal can be found. The remotely generated commands switch one of the plurality of video switches to insert a third video signal corresponding to the selected digitally formatted video signal.

It is a further object of the present invention to provide the cable system operator with local control to insert local commercials that are stored in a digital format thereby opting out of one digitally formatted and stored video signal to a second digitally stored video signal for a particular channel.

In accordance with the present invention, a video switch system is provided for receiving a plurality of programmed channel video signals wherein each programmed channel video signal corresponds to a respective channel of a plurality of channels. The video switch system selects, on a per channel basis, the programmed channel video signal, a commercial insert video signal or a locally generated video signal. The programmed channel video signals are sent independently of the commercial insert signals over a first telecommunications network. The commercial insert signals are sent over a second telecommunications network in addition to first, second and third switch commands corresponding to a respective programmed channel video signal, the commercial insert signal, and the local video signal. The commercial insert signals and the three switch commands are sent along with an insert locator data via a second telecommunications network. The switch system comprising:

a storage device for electronically storing a plurality of digitally formatted video signals at predetermined digital locations;

a device for obtaining, from the storage device, and for outputting a third video signal as the local video signal, the third video signal corresponding to one of the plurality of digitally formatted video signals that is obtained from the digital storage device using the insert locator data and, a plurality of video switches wherein a respective video switch corresponds to each one of the plurality of channels, each video switch receiving at three respective video inputs, the corresponding programmed channel video signal, the commercial insert video signals and the third video signal and, further, each video switch having a device for respectively applying one of the foregoing signals at a video output thereof based upon receipt of the respective first, second, and third switch commands at a control input of the respective video switch.

In summary, the present invention remotely controls on a per switch and hence a per channel basis the insertion of a commercial video signal sent with the switch commands or a locally generated video signal compiled from digitally stored video signals and also located on the digital storage device by insert locator data sent with the switch commands and the commercial insert video.

The video switch, in preferred embodiments, can generate a plurality of third video signals based upon a plurality of insert location information that is part of the insert locator data and apply respective third video signals to one or more of the video switches dependent upon switch commands and insert locator data generated remotely and received at the cable head end. The digitally formatted video signals can be sent to the video switch system via the second telecommunications network or via phone lines or be hand delivered on compact disc-read only memory (CD ROMs), magnetic tape, or other transportable media capable of storage of digital data.

BRIEF DESCRIPTION OF THE DRAWINGS

FIG. 3 illustrates an exemplary time chart showing the switch command sequence, the state of various video switches, a stream of commercial inserts (ACI), and various third video signals compiled from digitally stored video signals (DCI).

BEST MODE FOR CARRYING OUT THE INVENTION

Figure 1:
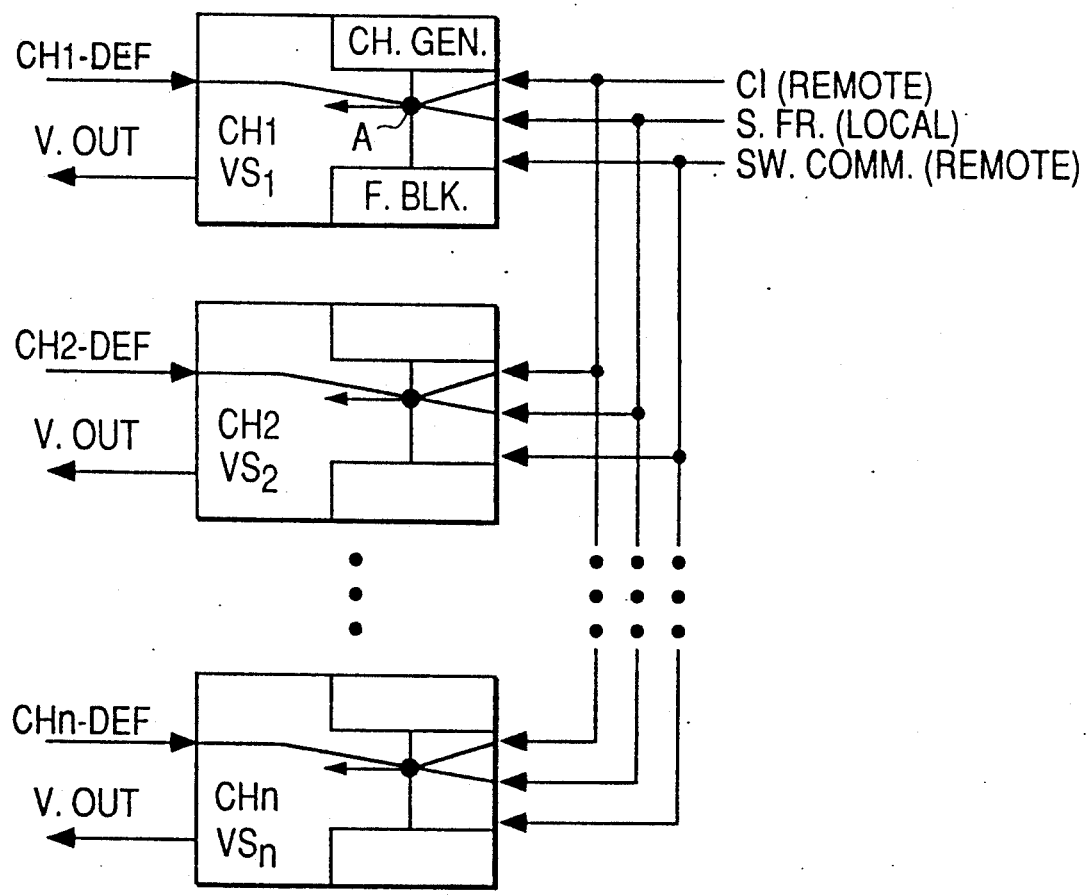
FIG. 1 illustrates a prior art commercial insertion system which was described in detail above.
Figure 2:
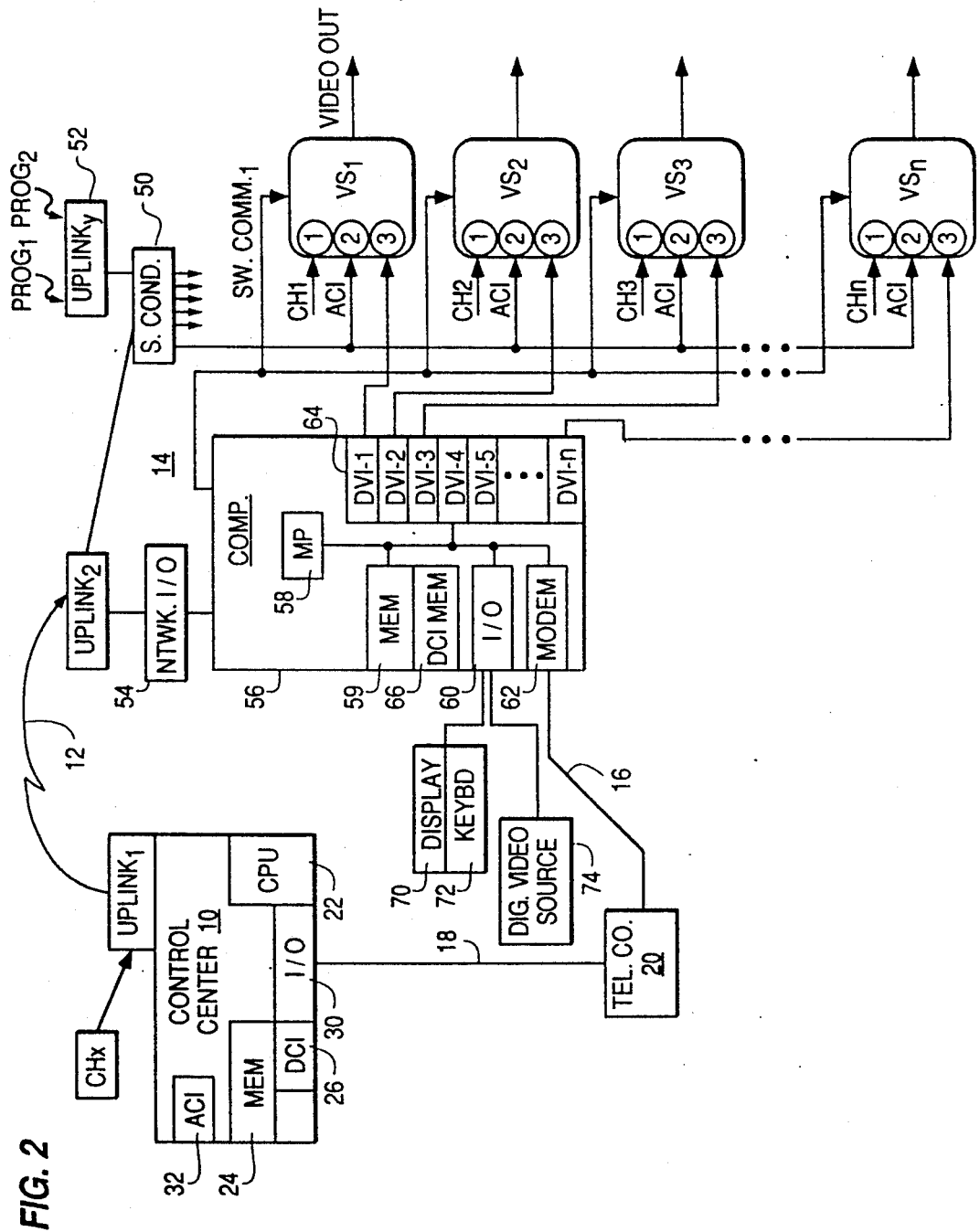
FIG. 2 is a block diagram showing the commercial insertion system of the present invention.

FIG. 2 diagrammatically illustrates control center 10 which is, at a minimum, electronically linked via telecommunications network 12 to a video switch system 14 located at or near the cable head end of a cable system. Telecommunications network 12 is a high speed network normally consisting of satellites and/or fiber optic cables. Optionally, video switch system 14 can be electronically connected to control center 10 via telephone line link 16 and 18 operated and established by telephone company 20.

Control center 10 includes central processing unit (CPU) 22 and memory 24 which includes digital commercial insert (DCI) memory 26. Control center 10 also includes input/output (I/0) 30 which permits CPU 22 to communicate with various communication systems, such as telephone line system 16, 18 and telecommunications network 12. Analog commercial inserts (ACI) are stored at a video source 32. Essentially, control center 10 and, in particular, CPU 22, monitors the plurality of programmed channels that have local avails. Upon sensing an upcoming local avail, CPU 22 compiles and generates a switch command for one of the switches $VS_1$-$VS_n$ at the video switch system 14. Upon sensing the actual local avail time, CPU 22 places the switch command on telecommunications network 22. Also, control center 10 places a generally continuous sequential stream of commercial inserts which are, in the illustrated embodiment, an analog stream, via Uplink$_1$ to telecommunications network 12. Further details of control center 10 are discussed in U.S. Pat. No. 4,814,883 to Perine et al. which is incorporated herein by reference thereto.

As discussed in the Perine patent, telecommunications network 12 can also handle a programmed channel video signal, identified in FIG. 2 as channel X (CHx). An important distinction between programmed channel CHx and the analog commercial inserts generated by control center 10 (ACI), as well as the command sequence generated by a control center, is that the programmed channel video signals are completely independent of the analog commercial inserts (ACI) and the command data generated by control center 10. At most, channel CHx, the ACI video stream and the switch command stream simply share telecommunications network 12. If local avails are present on channel CHx, CPU 22 would sense those local avails and provide switching commands for the video switch particularly associated with channel CHx.

Video switch system 14 receives the signals from telecommunications network 12 via Uplink$_2$. The programmed channel video signals are sent to signal conditioner 50 as are the plurality of programmed channel video signals from Uplink$_y$ 52. These other programs are identified as PROG$_1$ and PROG$_2$ in FIG. 2. Uplink$_2$ is coupled to network input/output (I/0) 54. In a preferred embodiment, network input/output 54 is an interface called Comstream.

A major portion of video switch system 14 is computer 56 which includes microprocessor (MP) 58, memory 59, input/output device 60, modem 62, and digital video interface (DVI) boards 64. Microprocessor 58 accesses digitally formatted data in memory 59, controls input and output to its environment via I/0 60, establishes a communications to telephone company 20 via modem 62, obtains digitally formatted video signals from the memory, converts and applies those signals to the third video inputs of various video switches via digital video interface (DVI) boards 64. Memory 59 includes digital commercial insert (DCI) memory 66. DCI memory 66 stores significant amounts of digitally formatted video signals such that those digitally formatted signals can be quickly manipulated and loaded into various DVI boards upon control of microprocessor 58. Video switch system 14 also includes an operator interface including a display 70 and a keyboard 72 which are coupled to computer 56 via I/0 60. Video switch system 14 also includes a mass storage digital video source 74. Access and transfer of various digital video signals from digital video source 74 is much slower than access to DCI memory 66 because DCI memory 66 is customarily a random access memory, whereas digital video source 74 provides mass storage of the signals with slow access time. Table 1 below lists various digital sources 74.

TABLE 1

Digital Video Sources

RAM
Hard Disk
Digital Network
CD-ROM
Digital Tape Players (magnetic tape)

Video switch system 14 includes a plurality of video switches $VS_1$, $VS_2$, $VS_3$ . . . and $VS_n$. At its control input, each video switch receives a switch command. Switch $VS_1$ receives switch command $Sw.Comm._1$ that controls which of three video inputs is applied to the video output. The three video inputs applied to each video switch are respective programmed channel video composite signals (for $VS_1$ this is CH1 which is the default input), a commercial insert input receiving an analog commercial insert video (ACI) composite signal, and a third video input that receives the analog version of the digitally formatted (DCI) video signals stored, at a minimum, in DCI memory 66 of computer 56. Accordingly, switch $VS_1$ applies programmed channel CH1 to its video output upon receipt of a first video switch command, applies the analog commercial input (ACI) to its video output upon receipt of a second switch command, and applies the analog version of the digitally formatted (DCI) video signal at its third input upon receipt of its third switch command. Additional features and operations of the video switches are disclosed in the Perine patent discussed above and incorporated herein by reference thereto.

The operation of the commercial insertion system is as follows. The telecommunications network 12 can carry the signal streams set forth in Table 2 below.

TABLE 2

Signal Stream From Control Center

1. ACI—analog, generally continuous commercial inserts
2. C.Sys.Add.—cable system address
3. Reg.Add.—regional address (SE, NE, etc.)
4. Switch commands
5. DCI location data
6. DCI digital commercial inserts (intermittent) (optional)

The ACI commercial inserts, cable system address, switch commands and digital commercial insert (DCI) location data are required signals. If control center 10 is communicating with a number of cable head ends, the addresses may be further grouped into a regional address indicating southeast, northeast, etc. as well as a particular cable system address. Although the digital video signals are stored for relatively immediate use in video switch system 14, either in digital video source 74 or DCI memory 66, control center 10 may also transmit DCI signals on an intermittent or optional basis via telecommunications network 12 to computer 56. In such a situation, computer 56 would recognize the incoming DCI satellite command, at least temporarily store the transmitted DCI signals in DCI memory 66, and then possibly transfer those digitally formatted video signals to digital video source 74. Alternatively, those satellite transmitted DCIs can remain in DCI memory 66. Optionally, control center 10 could transfer the DCI file over telephone lines 16, 18 through telephone company 20 to computer 56. A further option for delivering the DCI signals to video switch system 14 is to hand carry or mail the tangible device carrying the digitally formatted video signals. For example, a CD-ROM could be delivered to the cable head end and loaded into a CD-ROM player acting as digital video source 74. Otherwise, DCI signals could be transferred to digital video source 74 via floppy disc and permanently stored on a hard disc at the source or a random access memory that is continuously powered.

One of the important features of the present invention is that video switch system 14 has the capability of storing a large amount of digitally formatted video signals and the ability to compile or assemble DCI segments together to form one or more DCI sequential streams thereby providing multiple, optional input streams for each video switch, e.g., the default programmed channel video signal, the ACI signal (generally a continuous stream sent over telecommunications network 12) or the analog version of the DCI segments assembled and compiled as DCI streams which are converted to analog video signals by computer 56. In order for computer 56 to assemble, compile, convert, and apply these third video signals to one or more video switches, the computer must have certain data from control center 10. Table 3 which follows is an exemplary list of insert locator data that is utilized by computer 56 to assemble a DCI sequence file.

TABLE 3

Insert Locator Data or Information

DCI segment location 1
DCI segment location 2
DCI segment location n
Segment sequence
CH Id.
Assemble DCI sequence command As listed in Table 3, the DCI sequence is made up of a plurality of DCI segments. For example, if video switch $VS_1$ represents programmed channel generating 24 hours of news broadcasts which also provides local avails for the cable system operator, the system operator may want to insert commercials during approximately the 5 minutes near top of the hour and 5 minutes near the 30 minute break of the hour. The local avail on the 24 hour news channel could last about 2 minutes. Each DCI segment may occupy 15 seconds. Accordingly, eight DCI segments could be assembled and compiled and played through DVI boards 64, and in particular DVI-1, to $VS_1$. Alternatively, the analog commercial insert ACI could be applied to the output of $VS_1$ dependent upon the application of the second or third switch commands to $VS_1$.

Table 4 which follows shows the most important portions of the DCI program executed by computer 56.

TABLE 4
DCI Program

1. Assign file name
2. Assemble DCI sequence file
3. Id. CH. DVI board(s)
4. Initialize board(s)
5. Download DCI file to board(s)

Essentially, when computer 56 receives the insert locator data and, in particular, the assemble DCI sequence command, the computer assigns a file name, assembles the DCI sequence file from DCI segment locations 1, 2, ...n, identifies the channel DVI boards, initializes those boards, and downloads the DCI sequence file to the DVI boards. The digital video interface boards are smart or intelligent interface boards. Each board carries a microprocessor, random access memory of 1 or 2 megabytes and can be configured in a multi-tasking computer environment. In addition, the boards can accept as input composite video signals and convert those signals into digitally formatted video signals. In a preferred embodiment, the DVI boards are Action Media 750 Delivery Boards manufactured by Intel of Santa Clara, Calif. and Wiltshire, England.

Table 5 below illustrates a potential sequence for a single channel or single video switch.

TABLE 5

| Potential Sequence - Single Channel | |
|---|---|
| $t_0$ | DEF |
| $t_1$ | ACI - CI #1-4 |
| $t_2$ | DCI - DCI #1-4 |
| $t_3$ | DCI - Fixed Frame |
| $t_4$ | ACI - CI #9-11 |
| $t_5$ | DCI - Fixed Frame |
| $t_6$ | DEF |

In the foregoing table, the switch is initially in a state corresponding to the default wherein the regular programmed channel video signal is passed through the switch to its output. Beginning at time $t_1$, the switch receives the second switch command and applies the analog commercial insert ACI and CI segments 1, 2, 3 and 4 to the switch output. At $t_2$, the analog version of a DCI sequence is fed to the switch and DCI segments 1, 2, 3 and 4 are applied to the switch output upon receipt of the third switch command. At time $t_3$, the switch remains in the third input position, but the DCI sequence ends with a fixed video frame. At time $t_4$, the switch state is changed to the second input position and DCI 9, 10 and 11 are applied to its output. The sequential stream ACI is received at the cable head end via telecommunications network 12. At time $t_5$, a single frame or fixed frame video signal obtained via the analog version of a single DCI segment and is applied to the switch. At $t_6$, the switch state is changed to the first input state and the default or programmed channel video signal is passed through the switch to its output. The DCI sequence for the switch described above could include DCI segments 1, 2, 3, 4, and the fixed or single DCI video frame for the particular channel or the DCI sequence could be DCI segments 1-4 and simply includes a linking file command linking the assembled DCI sequence file to a second fixed, single video frame DCI segment file.

FIG. 3 illustrates an exemplary time chart for three video switches $VS_1$, $VS_2$, $VS_3$. The times $t_1$ through $t_{12}$ shown in FIG. 3 are not equal time intervals. Hence, switch $VS_1$ is switched to its default programmed channel input at $t_1$. All the switches in the video switch system may stay in the same state for a significant period of time before the switch for $CH_2$, $VS_2$, is commanded to change state (shown by X in FIG. 3) such that it selects the ACI input. At time $t_3$, CH1 video switch $VS_1$ is changed to accept the ACI input. At time $t_4$, CH3 video switch is switched to accept the ACI input. The ACI sequence is shown as having 10 ACI segments 1, 2, 3, ... 10. The sequence is shown as being continuous and repeating. As shown in FIG. 3, ACI segments 3 and 4 are played on channel 2 between times $t_2$ and $t_3$. ACI segment 5 is played on channels 1 and 2 between time intervals $t_3$ and $t_4$.

Sometime prior to time $t_5$, control center 10 generates insert locator data that is recognized and acted upon by computer 56 which compiles a DCI segment initially found at digital location 1a. In the illustrated embodiment shown in FIG. 3, the DCI sequence at 1a includes DCI segments D1, D2, D3, D4 and D5. This DCI sequence could be pre-stored as a single file in DCI memory 66. Alternatively, if sufficient was allocated by control center 10, the DCI sequence D1-D5 could be downloaded from digital video source 74 into DCI memory 66 prior to time $t_5$. In any event, channel 1 switch $VS_1$ is switched to the third video input at time $t_5$ and DCI sequence at location 1a is played on channel 1. In FIG. 3, a convention is adopted wherein at digital location 1a, a DCI sequence D1... D5 is found. At locations associated with #b, for example 1b, a single DCI segment is found as a single or fixed video frame composite signal. Accordingly, for channels 1, 2 and 3, fixed or single video frame signals are found at DCI locations 1b, 2b and 3b. A second DCI sequence is found at location 1c having DCI segments D12, D13 and D14. FIG. 3 also illustrates that DCI sequences can be linked. For example, in channel 1, the DCI sequence at location 1a is linked to DCI sequence at location 1c resulting the commercial insertion of digital video commercial inserts D1, D2, D3, D4, D5, D12, D13 and D14 on $VS_1$. Thereafter, on channel 1, switch $VS_1$ is changed to display the DCI segment as a single frame video for channel 1 at location 1b. Thereafter, at time $t_{11}$, channel 1 switch is changed to the default input to pass through the programmed channel signal.

Table 6 that follows illustrates potential output states for multiple channels or multiple channel switches.

TABLE 6

| | Potential Output States - Multiple Channels | |
|---|---|---|
| Channel | $t_1$ | $t_2$ |
| Ch 1 | DEF | ACI, CI #5 |
| Ch 2 | ACI, CI #3 | ACI, CI #5 |
| Ch 3 | DCI, DCI #D4 | DCI, #D6 |
| Ch 4 | DCI, Fixed Frame | DEF |
| Ch 5 | DCI, DCI #D4 | DCI, #D6 |
| Ch 6 | ACI, CI #3 | ACI, CI #5 |
| Ch 7 | DEF | DCI, Fixed Frame |
| Ch 8 | DCI, DCI #D8 | DCI, #D10 |

As shown in Table 6, DCI segments at location D4 are played on channels 3 and 5 while DCI segments D8 are being played on channel 8. ACI segment CI #3 is being played on channels 2 and 6. As is apparent from Table 6, the video switch system of the present invention provides greater flexibility than the video switch system disclosed in the Perine patent discussed above. In the present system, multiple DCI sequences can be played through one or more of the video switches and, hence, channels broadcast by the cable system. In contrast, all the switches in the second input state must play the same ACI segment. As shown in Table 6 at time $t_2$, ACI segment 5 is being played on channels 1, 2 and 6. DCI segment D6 is being played on channels 3 5 while a different DCI segment D10 is being played on channel 8.

Table 7 below is an exemplary program for the cable system computer 56.

TABLE 7

| Program for Cable System |
|---|
| Id. Reg. Add. |
| Id. C.Sys. Add. |
| Switch $VS_n$ to ACI at t |
| Record ACI 1, 2, 3 . . . l |
| IF X-DCI, Loc. k, prepare file at Loc. k and DVI board |
| Switch $VS_n$ to DCI, Loc. k at t |
| Stop Record ACI |
| Record DCI 1, 2, 3 . . . m |
| If X-DCI, Loc. r (S.Fr.), prepare file |
| Switch $VS_n$ to DCI, Loc. r (S.Fr.) |
| Stop Record DCI at Loc. k |
| Count and record time $VS_n$ as S.Fr. |
| Switch $VS_n$ to DEF |
| Stop record time |
| Compile ACI and DCI Ids and S.Fr. time |
| Transfer compilation to Control Center |

Computer 56 initially recognizes the appropriate address for the cable head end. Upon sensing the correct address, a particular video switch is switched according to ACI or DCI at a particular time t. One of the important features of the present commercial insertion system is the provision that all ACI segments actually played on a particular channel are recorded in memory 59. Control center 10 can download that information via telephone line 16, 18 and telephone company 20, thereby billing the advertisers for those commercials, collecting revenue, and sharing that revenue with the cable system operators. The program for the cable system recognizes the switch DCI commands as well as the insert locator data. To further enhance the feasibility of the present system, computer 56 maintains a log of the time the cable system operator places the single video frame on any particular channel. That time represents lost revenue to the cable system operator. Accordingly, a time record for single frame time is also compiled and sent along with the DCI segment records and the ACI segments records to control center 10.

Table 8 that follows lists exemplary DCI groups.

TABLE 8

| DCI Groups | | |
|---|---|---|
| DCI-Regional, A group | D1,D2,D3 . . . | Loc. u |
| DCI-Regional, B group | D9,D10,D11 . . . | Loc. v |
| DCI-Single Frames per channel | | Locs. 1b,2b . . . |
| DCI-Local group | D15,D16 . . . | Loc. w |

The digital commercial inserts (DCI) can be grouped into regional groups, per channel groups, or local option groups. The regional DCIs could be played on a regional basis at many cable head ends. Those DCIs may be periodically updated, such as weekly, by control center 10 either by delivering a CD-ROM or floppy disc or by electronically updating DCI memory 66 via telephone company communications link 16,18 and 20. Control center 10 also has the option of sending the regional DCI sequences to each cable head end via telecommunications network 12. The local group sequence DCI D15, D16 . . . at digital location w is configured such that the cable system operator can opt out of a particular ACI or DCI sequence. For example, the local cable operator may produce two or three 30 second commercials for a restaurant that is situated in or near his cable system. The restaurant may not be able to afford the price of regional television advertising on multiple cable systems and may wish to advertise only on a single cable system. With the present invention, the cable system operator can convert that 30 second local commercial to a digital format. The operator may use one of the digital video interface boards to convert the analog video signal into a digitally formatted video signal and store the same on DCI memory 66. Upon establishing the correct procedure with control center 10, the control center can assign that DCI segment digital location w.

Control center 10 can also configure an insert locator data to point to DCI segment w during any particular DCI sequence. Assume also that the cable system operator wants to collect the advertising revenue fee directly from the restaurant and wants to have the option of not playing the restaurant commercial at certain times or removing it from its files. Table 9 which follows illustrates a program module that can be run on computer 56 to establish such a system.

TABLE 9

| Local Control Program |
|---|
| Input local option command |
| If X-DCI, Loc. w and local option ON, then |
| Switch VS to DCI, Loc. w |
| Record D15, D16, D17 |
| If X-DCI, Loc. w and local option OFF, then |
| Maintain state of $VS_n$ |

The cable system operator would input the local option command via keyboard 58 or other control input into computer 56. In configuring an insert locator data, control center would identify DCI segment location w. The program in computer 56 would recognize digital location w and the ON state of the local option command and then switch a particular video switch and display the analog version of DCI segment at location w or would simply add a pointer to an established DCI sequence to point to DCI segment location w. Computer 56 would record the local option commercials D15, D16, and D17 and generate appropriate bills for the cable system operator. The local control program would also determine if control center 10 issued the DCI location w data and would sense that the local option control was in an OFF state. If so, the DCI sequence at location w (D15, D16 and D17) would not be applied to one or more of the video switches.

It is to be noted that the entire video switch system 14 can be a distributed processing system or an integrated system.

What is claimed is:

1. A video switch system for receiving a plurality of programmed channel video composite signals, each programmed channel video signal corresponding to a respective channel of a plurality of channels, and for selecting, on a per channel basis, said programmed channel video signal as a first video signal, a commercial insert video signal as a second video signal and a locally generated video signal, said plurality of programmed channel video signals being sent independently of said commercial insert signals over a first telecommunications network, the commercial insert signal being sent over a second telecommunications network, the switch system being remotely controlled on a per channel basis, by respective first, second and third switch commands, corresponding to a respective programmed channel video signal, the commercial insert signal and said local video signal, said first, second and third switch command signals being sent with insert locator data via said second telecommunications network, the switching system comprising:

means for storing a plurality of digitally formatted video signals at various predetermined locations;

means for obtaining from said means for storing, and outputting a third video signal as said local video signal, said third video signal corresponding to one of said plurality of digitally formatted videosignals that is obtained from said means for storing using said insert locator data, said insert locator data corresponding to select ones of said predetermined storage locations; and a plurality of video switches, a respective video switch corresponding to each one of said plurality of channels, each video switch receiving at three respective video inputs, the corresponding programmed channel video signal, said commercial insert video signal, and said third video signal, each video switch having means for respectively applying the same at a video output thereof based upon receipt of said respective first, second and third switch commands at a control input of the respective video switches.

2. A video switch system as claimed in claim 1 wherein said plurality of digitally formatted video signals are segmented into a plurality of digital commercial insert video signals, each digital commercial insert video segment having a respective assigned insert location, said one of said plurality of digitally formatted video signals having a respective assigned insert location that corresponds to said insert locator data.

3. A video switch system as claimed in claim 2 wherein said insert locator data includes a plurality of insert location information corresponding to a plurality of assigned insert locations and a like plurality of digital commercial insert video signals, said third video signal output by said means for obtaining being a compilation of said like plurality digital commercial insert video signals.

4. A video switch system as claimed in claim 1 wherein said programmed channel video signals are received via plurality of first telecommunications networks, said switch system including means for routing each said programmed channel video signals to said respective video switch.

5. A video switch system as claimed in claim 1 wherein said first and second telecommunications networks are a single communications network that carries said plurality of programmed channel video signals independent of said commercial insert video signals, the three switch commands and said insert locator data.

6. A video switch system as claimed in claim 1 wherein said means for obtaining includes means for outputting a plurality of discrete third video signals each corresponding to discrete ones of said plurality of digitally formatted video signals having respective insert locator data associated therewith, each said discrete third video signal switched on a per channel basis to respective video switch outputs based upon the third switch command for each said respective video switch.

7. A video switch system as claimed in claim 6 wherein said means for outputting a plurality of discrete third video signals includes means for applying same first discrete third video signals to multiple video switch inputs and for applying same second discrete third video signals to other video switch inputs.

8. A video switch system as claimed in claim 1 wherein said means for obtaining and outputting generates a plurality of independent third video signals based upon corresponding and respective independent insert locator data and which are switched on a per channel basis by respective video switches and respective third switch commands.

9. A video switch system as claimed in claim 8 wherein said insert locator data includes a local option signal, said switch system includes means for inputting a local override command, said means for obtaining and outputting, upon receipt of said local option signal and said local override command, obtaining and outputting a local commercial insert video signal as one of said plurality of independent third video signals which is switched on a per channel basis according to said respective third switch commands.

10. A video switch system as claimed in claim 3 wherein said means for obtaining and outputting includes means for sequentially linking said like plurality of digital commercial insert video signals together to form said third video signal as a sequential stream based upon said plurality of insert location information.

11. A video switch system as claimed in claim 10 wherein said means for sequentially linking forms a plurality of third video signals based upon a supraplurality of insert location information wherein said plurality of insert location information is associated together as a group, and a plurality of said groups form said supraplurality, said means for obtaining and outputting and placing respective third video signals at corresponding video switches based upon a respective third switch command and insert locator data.

* * * * *